US012094637B2

(12) United States Patent
Yen et al.

(10) Patent No.: US 12,094,637 B2
(45) Date of Patent: *Sep. 17, 2024

(54) INDUCTOR DEVICE

(71) Applicant: Realtek Semiconductor Corporation, Hsinchu (TW)

(72) Inventors: Hsiao-Tsung Yen, Hsinchu (TW); Ting-Yao Huang, Hsinchu (TW); Ka-Un Chan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 655 days.

This patent is subject to a terminal disclaimer.

(21) Appl. No.: 17/342,984

(22) Filed: Jun. 9, 2021

(65) Prior Publication Data

US 2022/0130590 A1 Apr. 28, 2022

(30) Foreign Application Priority Data

Oct. 26, 2020 (TW) ................................ 109137156

(51) Int. Cl.
*H01F 27/28* (2006.01)
*H01F 27/29* (2006.01)

(52) U.S. Cl.
CPC ......... *H01F 27/2804* (2013.01); *H01F 27/29* (2013.01); *H01F 2027/2809* (2013.01)

(58) Field of Classification Search
CPC ................. H01F 27/2804; H01F 27/29; H01F 2027/2809; H01F 19/04; H01F 2017/0046; H01F 2017/0073; H01F 2021/125; H01F 21/12; H01F 27/292
See application file for complete search history.

(56) References Cited

U.S. PATENT DOCUMENTS

| | | | | |
|---|---|---|---|---|
| 10,153,078 | B2 * | 12/2018 | Yen | H01F 27/29 |
| 10,186,364 | B2 | 1/2019 | Yen et al. | |
| 10,340,880 | B2 * | 7/2019 | Yen | H03H 7/42 |
| 2019/0237238 | A1 | 8/2019 | Yen et al. | |
| 2020/0251550 | A1 | 8/2020 | Yen et al. | |
| 2020/0312511 | A1 | 10/2020 | Yen et al. | |
| 2022/0130591 | A1 * | 4/2022 | Yen | H01F 27/2804 |

FOREIGN PATENT DOCUMENTS

| | | |
|---|---|---|
| TW | I699791 B | 7/2020 |
| TW | I722974 B | 3/2021 |
| TW | I727815 B | 5/2021 |

* cited by examiner

*Primary Examiner* — Malcolm Barnes

(74) *Attorney, Agent, or Firm* — Locke Lord LLP; Tim Tingkang Xia, Esq.

(57) ABSTRACT

An inductor device includes a first inductor, a first connection member, a second inductor, and a second connection member. The first inductor includes a first and a second trace. The first trace is disposed in a first area, and the second trace is disposed in a second area. The first and the second area are connected at a junction. The first connection member is disposed at a block at which the first and the second trace are not disposed, and coupled to the first and the second trace. The second inductor includes a third and a fourth trace. The third trace is disposed in the first area, and the fourth trace is disposed in the second area. The second connection member is disposed at a block at which the third and the fourth trace are not disposed, and coupled to the third and the fourth trace.

19 Claims, 5 Drawing Sheets

INDUCTOR DEVICE

RELATED APPLICATIONS

This application claims priority to and the benefit of Taiwan Application Serial Number 109137156, filed on Oct. 26, 2020, the entire contents of which are incorporated herein by reference as if fully set forth below in its entirety and for all applicable purposes.

BACKGROUND

Field of Invention

The present disclosure relates to an electronic device. More particularly, the present disclosure relates to an inductor device.

Description of Related Art

The various types of inductors according to the prior art have their advantages and disadvantages. For example, inductance density of an inductor or a transformer, having crossing structure, is low. In addition, Q value of stack-typed inductor or transformer is low. Therefore, the scopes of application of the above inductors are limited.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure is to provide an inductor device. The inductor device includes a first inductor, a first connection member, a second inductor, and a second connection member. The first inductor is located on a first layer, and the first inductor includes a first trace and a second trace. The first trace is disposed in a first area, and the second trace is disposed in a second area. The first area and the second area are connected to each other at a junction. The first connection member is disposed at a block at which the first trace and the second trace are not disposed and which is adjacent to the junction, and coupled to the first trace and the second trace. The second inductor is located on a second layer, and the second inductor includes a third trace and a fourth trace. The third trace is disposed in the first area, and the fourth trace is disposed in the second area. The second connection member is disposed at a block at which the third trace and the fourth trace are not disposed and which is adjacent to the junction, and coupled to the third trace and the fourth trace.

Therefore, based on the technical content of the present disclosure, the structure of the inductor device can use empty blocks to dispose connection members efficiently so as to simplify connection structure in the inductor device, and the usage area of the inductor device can be reduced. In addition, if two 8-shaped inductors are stacked to form the structure of the present disclosure, more metal layers at bottom layers should be used due to each of the 8-shaped inductors should be crossed at its center. Therefore, the quality factor (Q) of the inductor device decreases. If the structural configuration of the present disclosure is adopted, there is no need to cross at the center, such that the quality factor of the inductor device can be enhanced.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

Figure 1:
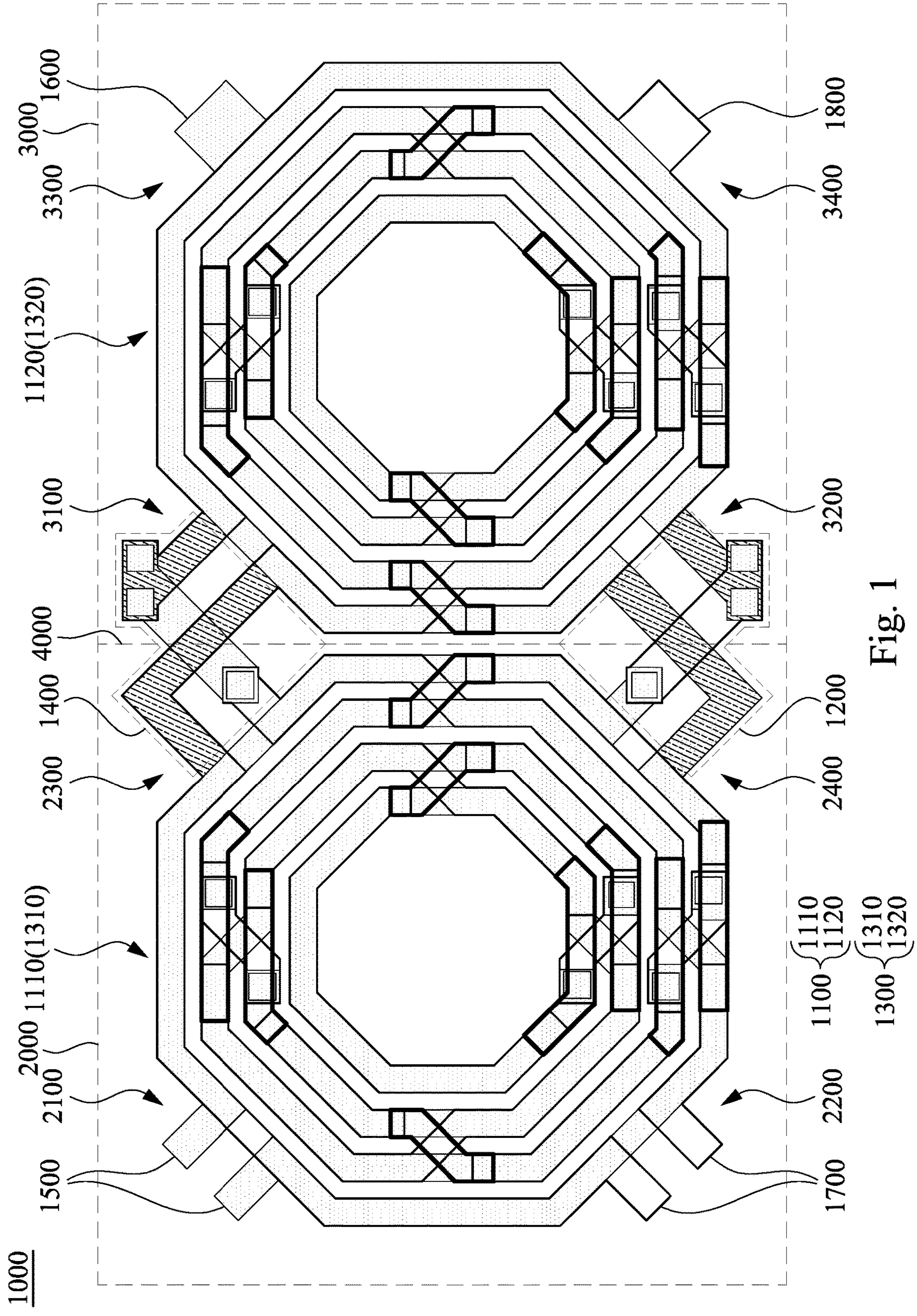
FIG. 1 depicts a schematic diagram of an inductor device according to one embodiment of the present disclosure.

FIG. 1 depicts a schematic diagram of an inductor device 1000 according to one embodiment of the present disclosure. As shown in the figure, the inductor device 1000 includes a first inductor 1100, a first connection member 1200, a second inductor 1300, and a second connection member 1400.

Figure 2:
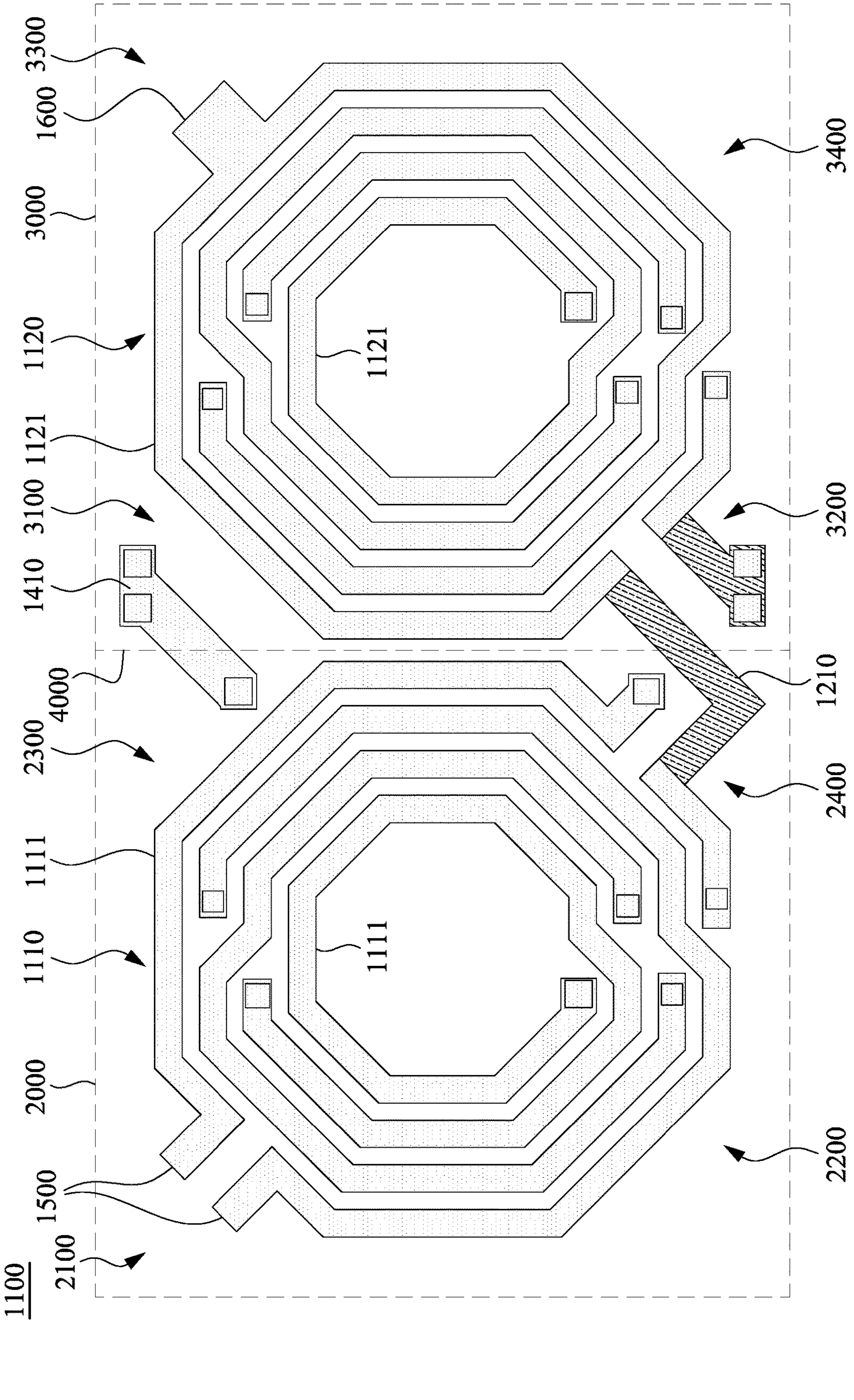
FIG. 2 depicts a schematic diagram of a partial structure of the inductor device shown in FIG. 1 according to one embodiment of the present disclosure.
Figure 3:
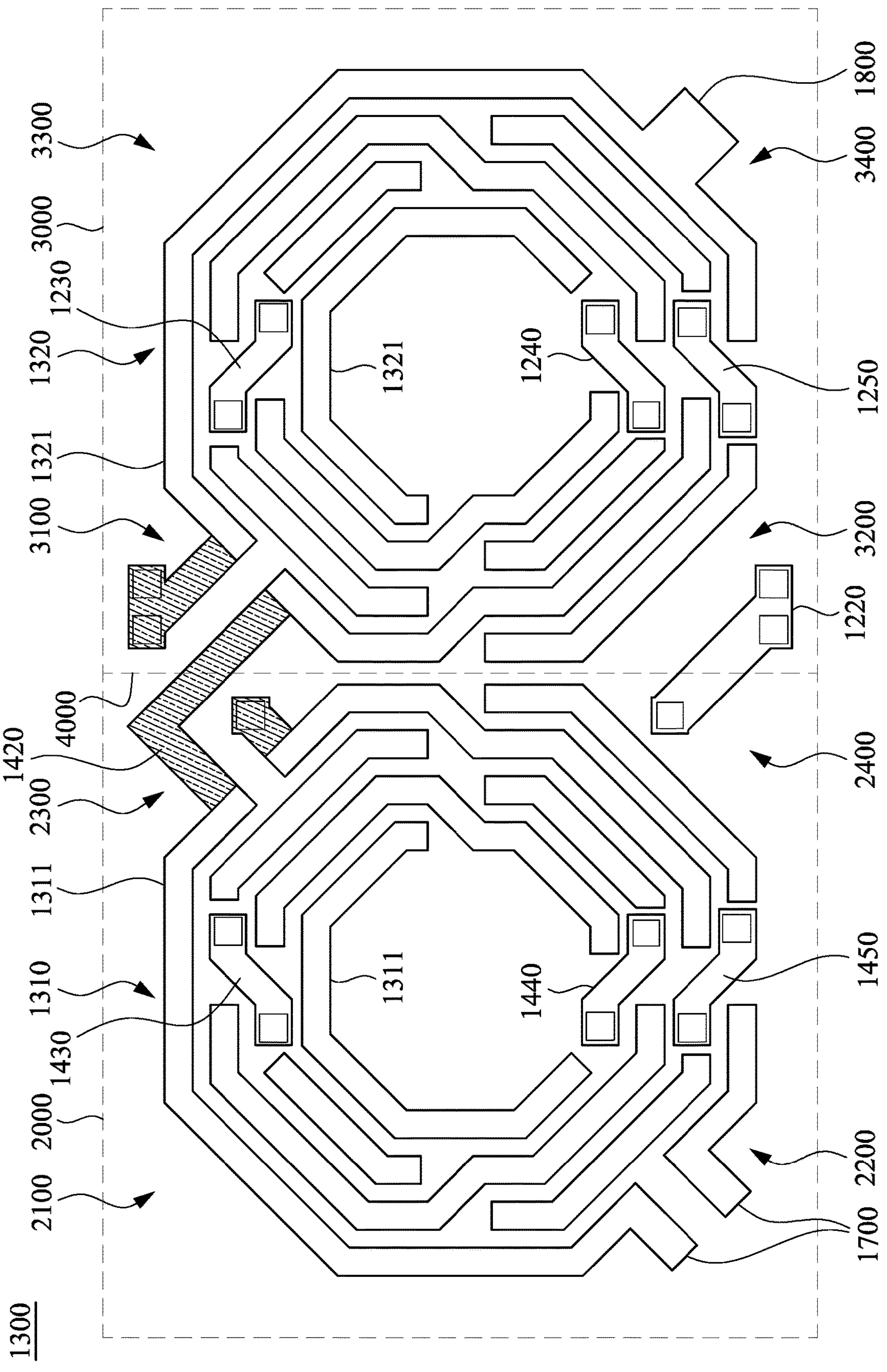
FIG. 3 depicts a schematic diagram of a partial structure of the inductor device shown in FIG. 1 according to one embodiment of the present disclosure.
Figure 4:
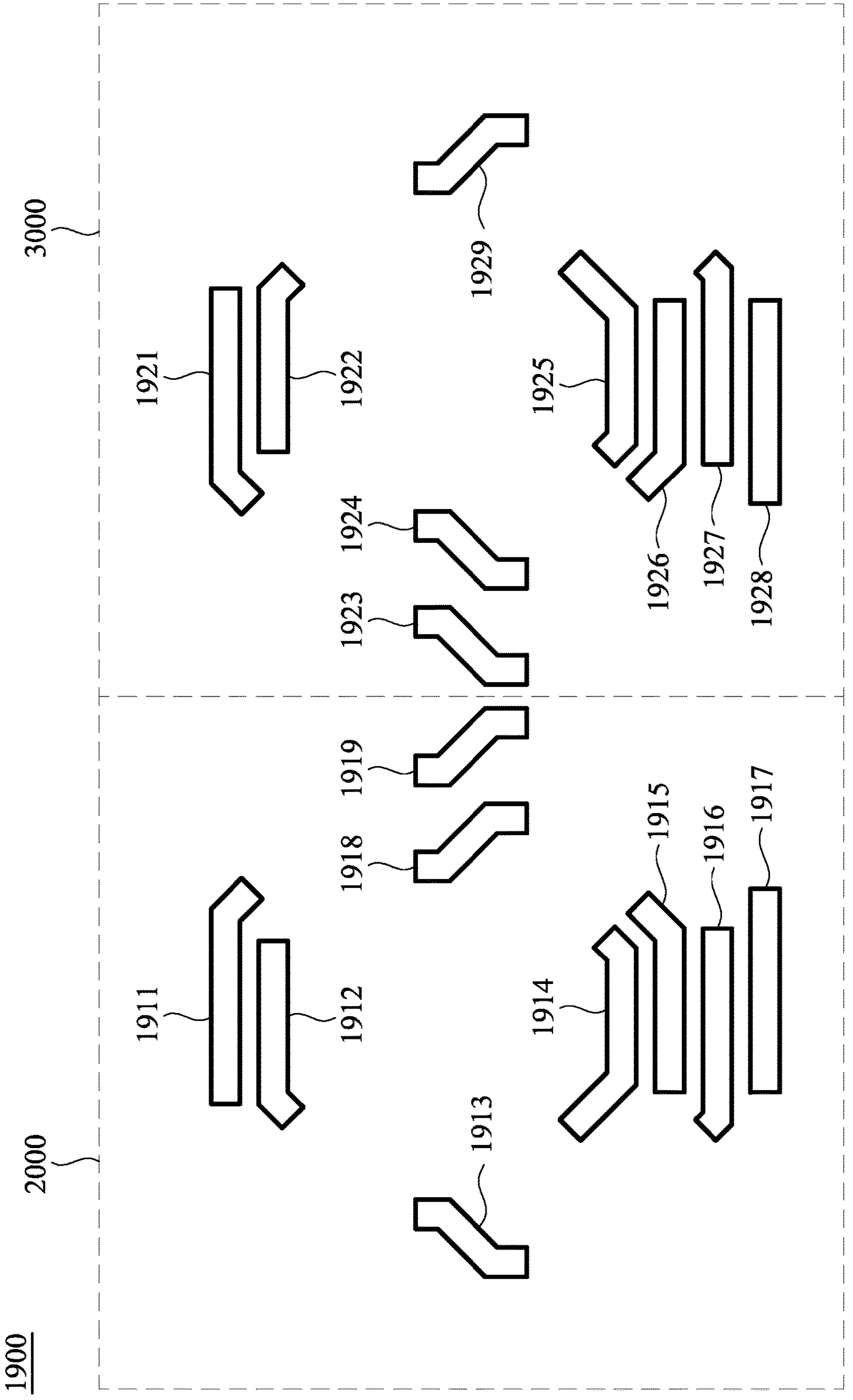
FIG. 4 depicts a schematic diagram of a partial structure of the inductor device shown in FIG. 1 according to one embodiment of the present disclosure.

For facilitating the understanding of the inductor device 1000 shown in FIG. 1, reference is now made to FIG. 2, FIG. 3, and FIG. 4. FIG. 2, FIG. 3, and FIG. 4 depict schematic diagrams of partial structures of the inductor device 1000 shown in FIG. 1 according to one embodiment of the present disclosure.

Referring to FIG. 1 and FIG. 2, the first inductor 1100 is located on a first layer, and the first inductor 1100 includes a first trace 1110 and a second trace 1120. The first trace 1110 is disposed in a first area 2000, and the second trace 1120 is disposed in a second area 3000. For example, the first trace 1110 is located at a left area in the figure, and the second trace 1120 is located at a right area in the figure.

In addition, the first area 2000 and the second area 3000 are connected to each other at a junction 4000. The first connection member 1200 is disposed at a block at which the first trace 1110 and the second trace 1120 are not disposed and which is adjacent to the junction 4000, and coupled to the first trace 1110 and the second trace 1120. For example, the first trace 1100 and the second trace 1120 are all octangle traces. Therefore, an upper left block 2100, a lower left block 2200, an upper right block 2300, and a lower right block 2400 of the first area 2000 do not have any first trace 1110 disposed therein. In other words, the blocks are empty blocks. Similarly, an upper left block 3100, a lower left block 3200, an upper right block 3300, and a lower right block 3400 of the second area 3000 do not have any second trace 1120 disposed therein, and the blocks are empty blocks as well. The empty blocks of the inductor device 1000 of the present disclosure are used to dispose the first connection member 1200 so as to connect the first trace 1110 and the second trace 1120. However, the present disclosure is not limited to the foregoing embodiments in FIG. 1 and FIG. 2, the type of the first trace 1110 and the second trace 1120 can be set to be other type, for example, diamond, depending on actual requirement. Since there are empty blocks around a diamond trace, the first connection member 1200 can be disposed at the empty blocks as well.

Reference is made to both FIG. 1 and FIG. 3, the second inductor 1300 is located on the second layer, and the second inductor 1300 includes a third trace 1310 and a fourth trace 1320. The third trace 1310 is disposed in the first area 2000, and the fourth trace 1320 is disposed in the second area 3000. The second connection member 1400 is disposed at a block at which the third trace 1310 and the fourth trace 1320 are not disposed and which is adjacent to the junction 4000, and coupled to the third trace 1310 and the fourth trace 1320. Similarly, the third trace 1310 and the fourth trace 1320 are all octangle traces. Therefore, the blocks 2100, 2200, 2300, 2400 of the first area 2000 do not have any third trace 1310 disposed therein. In other words, the blocks are empty blocks. Similarly, the blocks 3100, 3200, 3300, 3400 of the second area 3000 do not have any fourth trace 1320 disposed therein, and the blocks are empty blocks as well. The empty blocks of the inductor device 1000 of the present disclosure are used to dispose the second connection member 1400 so as to connect the third trace 1310 and the fourth trace 1320. However, the present disclosure is not limited to the foregoing embodiments in FIG. 1 and FIG. 3, the type of the third trace 1310 and the fourth trace 1320 can be set to be other type, for example, diamond, depending on actual requirement. Since there are empty blocks around a diamond trace, the second connection member 1400 can be disposed at the empty blocks as well.

Reference is now made to both FIG. 2 and FIG. 3, the first connection member 1200 is located on the first layer and the second layer, and the first layer is different from the second layer. For example, as shown in FIG. 2, the first connection member 1200 includes the first sub-connection member 1210 located on the first layer, and the first sub-connection member 1210 is coupled to the first trace 1110 and the second trace 1120. In addition, as shown in FIG. 3, the first connection member 1200 further includes a second sub-connection member 1220 located on the second layer, and the second sub-connection member 1220 is coupled to the first trace 1110 and the second trace 1120, which are located on the first layer, of FIG. 2 through a plurality of vias (e.g., the square structure shown in the figure).

As shown in FIG. 2, the first trace 1110 includes a plurality of first wires 1111, and the second trace 1120 includes a plurality of second wires 1121. In one embodiment, the inductor device 1000 further includes a first input/output member 1500. The first input/output member 1500 is disposed in the first area 2000, and coupled to the first wire 1111 which is located at an outermost side among the first wires 1111. In addition, the first input/output member 1500 is located on the first layer.

In some embodiments, the first input/output member 1500 includes a first terminal and a second terminal. The first terminal (e.g., the lower terminal as shown in the figure) of the first input/output member 1500 is coupled to the first wire 1111 which is located at an outermost side among the first wires 1111. The second terminal (e.g., the upper terminal as shown in the figure) of the first input/output member 1500 is disposed at a side which is opposite to the junction 4000, and located at a block at which the first trace 1110 and the second trace 1120 are not disposed. For example, the upper terminal of the first input/output member 1500 is disposed at a left side of the junction 4000 formed by the first area 2000 and the second area 3000, and located at the upper left block 2100 at which the first trace 1110 and the second trace 1120 are not disposed, wherein the upper left block 2100 is located at the upper left corner of the first area 2000.

In one embodiment, the inductor device 1000 further includes a first center-tapped member 1600. The first center-tapped member 1600 is disposed in the second area 3000, and coupled to the second wire 1121 which is located at an outermost side among the second wires 1121. In addition, the first center-tapped member 1600 is located on the first layer.

In some embodiments, the first center-tapped member 1600 includes a first terminal and a second terminal. The first terminal (e.g., the lower terminal as shown in the figure) of the first center-tapped member 1600 is coupled to the second wire 1121 which is located at an outermost side among the second wires 1121. The second terminal (e.g., the upper terminal as shown in the figure) of the first center-tapped member 1600 is disposed in at a side which is opposite to the junction 4000, and located at a block at which the first trace 1110 and the second trace 1120 are not disposed. For example, the upper terminal of the first center-tapped member 1600 is disposed at a right side of the junction 4000 formed by the first area 2000 and the second area 3000, and located at the upper right block 3300 at which the first trace 1110 and the second trace 1120 are not disposed, wherein the upper right block 3300 is located at the upper right corner of the second area 3000.

In one embodiment, the first wires 1111 and the second wires 1121 are coupled to each other at a first side (e.g., the upper side) and a second side (e.g., the lower side) of the inductor device 1000 in an interlaced manner. It is noted that, the present disclosure is not intended to be limited to the embodiments of FIG. 2, the first wires 1111 and the second wires 1121 can be coupled to each other at a third side (e.g., the left side) and a fourth side (e.g., the right side) of the inductor device 1000 depending on actual requirements.

In one embodiment, the inductor device 1000 further includes a plurality of first bridge connections. Referring to FIG. 2, one opening of the first wires 1111 at the first side (e.g., the upper side as shown in the figure) can be coupled by the first bridge connection 1430 shown in FIG. 3. Therefore, the first wires 1111 are coupled to each other at the first side of the inductor device 1000 in an interlaced manner. In addition, two openings of the first wires 1111 at the second side (e.g., the lower side as shown in the figure) can be coupled by the first bridge connection 1440 and the first bridge connection 1450 shown in FIG. 3 respectively. Therefore, the first wires 1111 are coupled to each other at the second side of the inductor device 1000 in an interlaced manner. The first bridge connection 1430, the first bridge connection 1440, and the first bridge connection 1450 are located on the second layer. Similarly, one opening of the second wires 1121 at the first side (e.g., the upper side as shown in the figure) can be coupled by the first bridge connection 1230 shown in FIG. 3, and two openings of the second wires 1121 at the second side (e.g., the lower side as shown in the figure) can be coupled by the first bridge connection 1240 and the first bridge connection 1250 shown in FIG. 3 respectively. Therefore, the second wires 1121 are coupled to each other at the first side and the second side of the inductor device 1000 in an interlaced manner.

Referring to FIG. 2 and FIG. 3, the third trace 1310 and the fourth trace 1320 are located on the second layer, and the second connection member 1400 is located on the first layer and the second layer at the same time. For example, as shown in FIG. 2, the second connection member 1400 includes a third sub-connection member 1410 located on the first layer, and the third sub-connection member 1410 is coupled to the third trace 1310 and the fourth trace 1320 located on the second layer in FIG. 3 through a plurality of vias (e.g., the square structure shown in the figure). In addition, referring to FIG. 3, the second connection member 1400 further includes a fourth sub-connection member 1420 located on the second layer, and the fourth sub-connection member 1420 is used to couple the third trace 1310 and the fourth trace 1320.

Referring to FIG. 3, the third trace 1310 includes a plurality of third wires 1311, and the fourth trace 1320 includes a plurality of fourth wires 1321. In one embodiment, the inductor device 1000 further includes a second input/output member 1700. The second input/output member 1700 is disposed in the first area 2000, and coupled to the third wire 1311 which is located at an outermost side among the third wires 1311. In addition, the second input/output member 1700 is located on the second layer.

In some embodiments, the second input/output member 1700 includes a first terminal and a second terminal. The first terminal (e.g., the upper terminal as shown in the figure) of the second input/output member 1700 is coupled to the third wire 1311 which is located at an outermost side among the third wires 1311. The second terminal (e.g., the lower terminal as shown in the figure) of the second input/output member 1700 is disposed at a side which is opposite to the junction 4000, and located at a block at which the third trace 1310 and the fourth trace 1320 are not disposed. For example, the lower terminal of the second input/output member 1700 is disposed at a left side of the junction 4000 formed between the first area 2000 and the second area 3000, and located at the lower left block 2200 at which the third trace 1310 and the fourth trace 1320 are not disposed, wherein the lower left block 2200 is located at the lower left corner of the first area 2000.

In one embodiment, the inductor device 1000 further includes a second center-tapped member 1800. The second center-tapped member 1800 is disposed in the second area 3000, and coupled to the fourth wire 1321 which is located at an outermost side among the fourth wires 1321. In addition, the second center-tapped member 1800 is located on the second layer.

In some embodiments, the second center-tapped member 1800 includes a first terminal and a second terminal. The first terminal (e.g., the upper terminal as shown in the figure) of the second center-tapped member 1800 is coupled to the fourth wire 1321 which is located at an outermost side among the fourth wires 1321. The second terminal (e.g., the lower terminal as shown in the figure) of the second center-tapped member 1800 is disposed at a side which is opposite to the junction 4000, and located at a block at which the third trace 1310 and the fourth trace 1320 are not disposed. For example, the lower terminal of the second center-tapped member 1800 is disposed at a right side of the junction 4000 formed between the first area 2000 and the second area 3000, and located at the lower right block 3400 at which the third trace 1310 and the fourth trace 1320 are not disposed, wherein the lower right block 3400 is located at the lower right corner of the second area 3000.

In one embodiment, the third wires 1311 and the fourth wires 1321 are coupled to each other at a third side (e.g., the left side as shown in the figure) and a fourth side (e.g., the right side as shown in the figure) of the inductor device 1000 in an interlaced manner. In another embodiment, the first side and the second side are located in a first direction (e.g., a perpendicular direction as shown in the figure), the third side and the fourth side are located in a second direction (e.g., a horizontal direction as shown in the figure), and the first direction is perpendicular to the second direction.

In one embodiment, the inductor device 1000 further includes a plurality of second bridge connections. Referring to FIG. 3, two openings of the third wires 1311 at the first side (e.g., the upper side as shown in the figure) can be coupled by the second bridge connections 1911, 1912 shown in FIG. 4 respectively. In addition, four openings of the third wires 1311 at the second side (e.g., the lower side as shown in the figure) can be coupled by the second bridge connections 1914, 1915, 1916, 1917 shown in FIG. 4 respectively. Besides, one opening of the third wires 1311 at the third side (e.g., the left side as shown in the figure) can be coupled by the second bridge connection 1913 shown in FIG. 4. Therefore, the third wires 1311 are coupled to each other at the third side of the inductor device 1000 in an interlaced manner. In addition, two openings of the third wires 1311 at the fourth (e.g., the right side as shown in the figure) can be coupled by the second bridge connections 1918, 1919 shown in FIG. 4. Therefore, the third wires 1311 are coupled to each other at the fourth side of the inductor device 1000 in an interlaced manner. The second bridge connections 1911~1919 are located on the third layer.

In addition, two openings of the fourth wires 1321 at the first side (e.g., the upper side as shown in the figure) can be coupled by the second bridge connections 1921, 1922 shown in FIG. 4 respectively. In addition, four openings of the fourth wires 1321 at the second side (e.g., the lower side as shown in the figure) can be coupled by the second bridge connections 1925, 1926, 1927, 1928 shown in FIG. 4 respectively. Besides, two openings of the fourth wires 1321 at the third side (e.g., the left side as shown in the figure) can be coupled by the second bridge connections 1923, 1924 shown in FIG. 4. Therefore, the fourth wires 1321 are coupled to each other at the third side of the inductor device 1000 in an interlaced manner. In addition, one opening of the fourth wires 1321 at the fourth side (e.g., the right side as shown in the figure) can be coupled by the second bridge connection 1929 shown in FIG. 4. Therefore, the fourth wires 1321 are coupled to each other at the fourth side of the inductor device 1000 in an interlaced manner. The second bridge connections 1921-1929 are located on the third layer.

In one embodiment, elements illustrated in FIG. 2 are all located on the first layer, elements illustrated in FIG. 3 are all located on the second layer, and elements illustrated in FIG. 4 are all located on the third layer. The first layer, the second layer, and the third layer are different layers. However, the present disclosure is not limited to the structure as shown in FIG. 1 to FIG. 4, and it is merely an example for illustrating one of the implements of the present disclosure.

Figure 5:
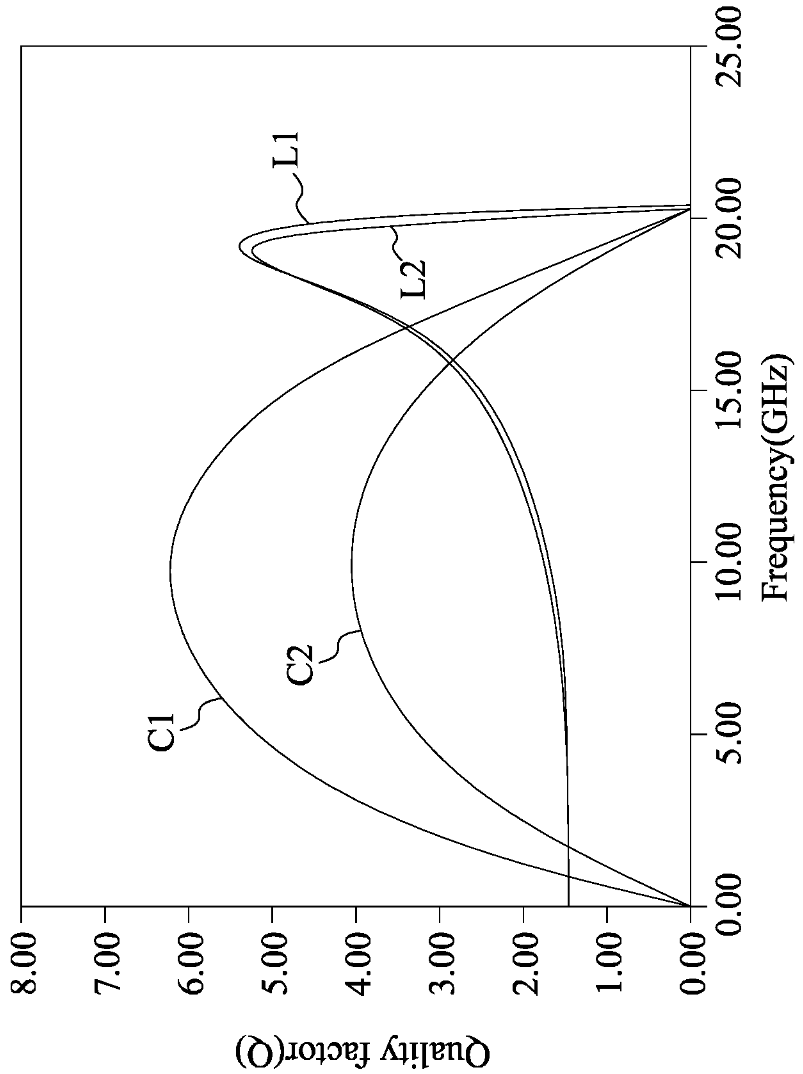
FIG. 5 depicts a schematic diagram of experimental data of an inductor device according to one embodiment of the present disclosure.

FIG. 5 depicts a schematic diagram of experimental data of the inductor device 1000 according to one embodiment of the present disclosure. As shown in the figure, the experimental curve of the quality factor of the first inductor 1100 of the inductor device 1000 adopting the structural configuration of the present disclosure is C1, and the experimental curve of the inductance value of the first inductor 1100 of the inductor device 1000 is L1. In addition, the experimental curve of the quality factor of the second inductor 1300 of the inductor device 1000 adopting the structural configuration of the present disclosure is C2, and the experimental curve of the inductance value of the second inductor 1300 is L2. As can be seen from the figure, the inductor device 1000 adopting the structure of the present disclosure has better quality factor. For example, at a frequency of about 5 GHz, the quality factor of the inductor device 1000 is about 5.2. In one embodiment, the size of the inductor device 1000 of the present disclosure is 130 μm×64 μm, the width of the inductor device 1000 is 3 μm, and the spacing of the inductor device 1000 is 2 a m. However, the present disclosure is not limited to the structure as shown in FIG. 5, and it is merely an example for illustrating one of the implements of the present disclosure.

It can be understood from the embodiments of the present disclosure that application of the present disclosure has the following advantages. The structure of the inductor device can use empty blocks to dispose connection members efficiently so as to simplify connection structure in the inductor device, and the usage area of the inductor device can be reduced. In addition, if two 8-shaped inductors are stacked to form the structure of the present disclosure, more metal layers at bottom layers should be used due to each of the 8-shaped inductors should be crossed at its center. Therefore, the quality factor (Q) of the inductor device decreases. If the structural configuration of the present disclosure is adopted, there is no need to cross at the center, such that the quality factor of the inductor device can be enhanced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:
- a first inductor, located on a first layer, comprising:
  - a first trace, disposed in a first area; and
  - a second trace, disposed in a second area, wherein the first area and the second area are connected to each other at a junction;
- a first connection member, disposed at a block at which the first trace and the second trace are not disposed and which is adjacent to the junction, and coupled to the first trace and the second trace;
- a second inductor, located on a second layer different from the first layer, comprising:
  - a third trace, disposed in the first area; and
  - a fourth trace, disposed in the second area; and
- a second connection member, disposed at a block at which the third trace and the fourth trace are not disposed and which is adjacent to the junction, and coupled to the third trace and the fourth trace,
- wherein the first connection member is located on the first layer and the second layer.

2. The inductor device of claim 1, wherein the first connection member comprises:
- a first sub-connection member, located on the first layer, and coupled to the first trace and the second trace; and
- a second sub-connection member, located on the second layer, and coupled to the first trace and the second trace through a plurality of vias.

3. The inductor device of claim 2, wherein the first trace comprises a plurality of first wires, and the second trace comprises a plurality of second wires.

4. The inductor device of claim 3, further comprising:
- a first input/output member, disposed in the first area, and coupled to the first wire which is located at an outermost side among the first wires, wherein the first input/output member is located on the first layer.

5. The inductor device of claim 4, wherein the first input/output member comprises:
- a first terminal, coupled to the first wire which is located at an outermost side among the first wires; and
- a second terminal, disposed at a side which is opposite to the junction, and located at a block at which the first trace and the second trace are not disposed.

6. The inductor device of claim 5, further comprising:
- a first center-tapped member, disposed in the second area, and coupled to the second wire which is located at an outermost side among the second wires, wherein the first center-tapped member is located on the first layer.

7. The inductor device of claim 6, wherein the first center-tapped member comprises:
- a first terminal, coupled to the second wire which is located at an outermost side among the second wires; and
- a second terminal, disposed at a side which is opposite to the junction, and located at a block at which the first trace and the second trace are not disposed.

8. The inductor device of claim 7, wherein the first wires and the second wires are coupled to each other at a first side and a second side of the inductor device in an interlaced manner.

9. The inductor device of claim 8, further comprising:
- a plurality of first bridge connections, wherein the first wires and the second wires are coupled to each other at the first side and the second side of the inductor device in an interlaced manner through the first bridge connections, wherein the first bridge connection is located on the second layer.

10. The inductor device of claim 9, wherein the third trace and the fourth trace are located on the second layer, and the second connection member is located on the first layer and the second layer.

11. The inductor device of claim 10, wherein the second connection member comprises:

a third sub-connection member, located on the first layer, and coupled to the third trace and the fourth trace through the vias; and a fourth sub-connection member, located on the second layer, and coupled to the third trace and the fourth trace.

12. The inductor device of claim 11, wherein the third trace comprises a plurality of third wires, and the fourth trace comprises a plurality of fourth wires.

13. The inductor device of claim 12, further comprising:

a second input/output member, disposed in the first area, and coupled to the third wire which is located at an outermost side among the third wires, wherein the second input/output member is located on the second layer.

14. The inductor device of claim 13, wherein the second input/output member comprises:

a first terminal, coupled to the third wire which is located at an outermost side among the third wires; and a second terminal, disposed at a side which is opposite to the junction, and located at a block at which the third trace and the fourth trace are not disposed.

15. The inductor device of claim 14, further comprising:

a second center-tapped member, disposed in the second area, and coupled to the fourth wire which is located at an outermost side among the fourth wires, wherein the second center-tapped member is located on the second layer.

16. The inductor device of claim 15, wherein the second center-tapped member comprises:

a first terminal, coupled to the fourth wire which is located at an outermost side among the fourth wires; and a second terminal, disposed at a side which is opposite to the junction, and located at a block at which the third trace and the fourth trace are not disposed.

17. The inductor device of claim 16, wherein the third wires and the fourth wires are coupled to each other at a third side and a fourth side of the inductor device in an interlaced manner.

18. The inductor device of claim 17, wherein the first side and the second side are located at a first direction, the third side and the fourth side are located at a second direction, and the first direction is perpendicular to the second direction.

19. The inductor device of claim 18, further comprising:

a plurality of second bridge connections, wherein the third wires and the fourth wires are coupled to each other at the third side and the fourth side of the inductor device in an interlaced manner through the second bridge connections, wherein the second bridge connections are located on a third layer.

* * * * *